United States Patent
Laurent

(10) Patent No.: US 11,190,823 B2
(45) Date of Patent: Nov. 30, 2021

(54) ACCESS NODE, SYSTEM AND METHOD FOR CONTROLLING USER ACCESS TO THE INTERNET AND TO TELEVISION

(71) Applicant: Adrien Laurent, Montreal (CA)

(72) Inventor: Adrien Laurent, Montreal (CA)

(73) Assignee: Adrien Laurent, Montreal (CA)

( * ) Notice: Subject to any disclaimer, the term of this patent is extended or adjusted under 35 U.S.C. 154(b) by 68 days.

(21) Appl. No.: 16/717,793

(22) Filed: Dec. 17, 2019

(65) Prior Publication Data

US 2020/0204845 A1 Jun. 25, 2020

Related U.S. Application Data

(60) Provisional application No. 62/781,922, filed on Dec. 19, 2018.

(51) Int. Cl.
| | | |
|---|---|---|
| *H04N 21/475* | (2011.01) | |
| *H04N 21/258* | (2011.01) | |
| *H04L 29/06* | (2006.01) | |
| *H04N 21/482* | (2011.01) | |
| *H04N 21/462* | (2011.01) | |
| *G06Q 40/02* | (2012.01) | |
| *H04L 29/08* | (2006.01) | |

(52) U.S. Cl.
CPC ....... *H04N 21/25816* (2013.01); *G06Q 40/02* (2013.01); *H04L 63/08* (2013.01); *H04L 63/102* (2013.01); *H04L 67/02* (2013.01); *H04L 67/42* (2013.01); *H04N 21/4622* (2013.01); *H04N 21/4751* (2013.01); *H04N 21/4753* (2013.01); *H04N 21/482* (2013.01)

(58) Field of Classification Search
None
See application file for complete search history.

(56) References Cited

U.S. PATENT DOCUMENTS 5,973,683 A * 10/1999 Cragun .................. H04N 7/163
348/E7.061
9,199,171 B2 * 12/2015 Mizuki .............. H04N 21/4312
(Continued)

OTHER PUBLICATIONS

"Captive portal"; Web page retrieved from <https://en.wikipedia.org/w/index.php?title=Captive_portal&oldid=922311879> on Dec. 16, 2019.

(Continued)

*Primary Examiner* — Cai Y Chen
(74) *Attorney, Agent, or Firm* — BCF LLP

(57) ABSTRACT

An access node limits access of a user to a medium such as an Internet resource of a television program. The access node comprises upstream and downstream interfaces, a memory and a processor. The upstream interface is connectable to an Internet service provider. The downstream interface is connectable to a client device. The memory stores a user account for a user of the client device. The processor detects, via the downstream interface, an access from the user of the client device, in response to detecting the access, causes the client device to display a challenge, receives, via the downstream interface, a challenge response from the client device, and if the challenge response is a correct response, adds to the user account, a credit for connection of the client device to the medium. The access node may be part of a system including a server.

19 Claims, 7 Drawing Sheets

(56) References Cited

U.S. PATENT DOCUMENTS

2008/0300055 A1* 12/2008 Lutnick .................. G07F 17/32
                                                                463/39
2016/0241929 A1*  8/2016 Shenkler ............ H04N 21/4312
2017/0084119 A1*  3/2017 Smock ................ G07F 17/3211

OTHER PUBLICATIONS

Kobayashi, Mariko, "Survey on Behaviors of Captive Portals", Mar. 2017, 16 pages, IETF98, Chicago, IL.

* cited by examiner

ACCESS NODE, SYSTEM AND METHOD FOR CONTROLLING USER ACCESS TO THE INTERNET AND TO TELEVISION

CROSS-REFERENCE

The present application claims priority to U.S. Provisional Patent Application No. 62/781,922, filed on Dec. 19, 2018, the entirety of which is incorporated herein by reference.

TECHNICAL FIELD

The present disclosure relates to the field of Internet devices. More specifically, the present disclosure relates to an access node, a system and a method for controlling user access to the Internet and to television.

BACKGROUND

Excessive time spent by children watching television or accessing the Internet on personal devices, such as tablets, is a frequent problem. A parent may desire to limit the time spent by children on their devices or watching television. Current solutions are difficult to use or impractical. They may imply time-consuming configuration processes. Current solutions merely provide time limitations to access to media, without providing any opportunity for learning.

Current Internet limiting devices often require parents to set and reset limits. They do not provide self-regulating control of access time. Most of the current usage limitation solutions are based on functions implemented in devices used by the children and require all individual devices to be individually locked or unlocked. Many devices do not support any function allowing to regulate the time spent by children accessing the Internet, television programs, or other media.

Therefore, there exists a need to provide solutions for managing, controlling and limiting user access to media, such as Internet resources and/or television programs that do not require continuous involvement from their parents.

SUMMARY

According to the present disclosure, there is provided an access node for controlling access of a user to a medium. The access node comprises upstream and downstream interfaces, a memory and a processor. The upstream interface is connectable to a server. The downstream interface is connectable to a client device. The memory stores a user account for a user of the client device. The processor is operatively connected to the upstream interface, to the downstream interface, and to the memory. The processor is configured to detect, via the downstream interface, an access from the user of the client device, in response to detecting the access, cause the client device to display a challenge, receive, via the downstream interface, a challenge response from the client device, and if the challenge response is a correct response, add to the user account, a credit for connection of the client device to the medium.

According to the present disclosure, there is also provided a method for controlling access of a user to a medium. An access node detects an access from a user of a client device. In response to detecting the access, the access node transmits a challenge to the client device. The access node receives a challenge response from the client device. If the challenge response is a correct response, the access node adds a credit for connection of the client device to the medium to a user account stored in the access node. The access node receives, from the client device, a request to connect to the medium. The access node verifies the user account. If the user account contains at least one credit, the access node decrements the user account by one credit and grants a connection between the client device and the medium.

The present disclosure further relates to system for controlling access of a user to a medium. The system comprises the access node and the server. The server is communicatively coupled to the upstream interface of the access node. The server is configured to store one or more challenge series, receive configuration parameters from a device of a parent user, select at least one challenge series based on the configuration parameters, and transmit the selected at least one challenge series to the access node.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Figure 1:
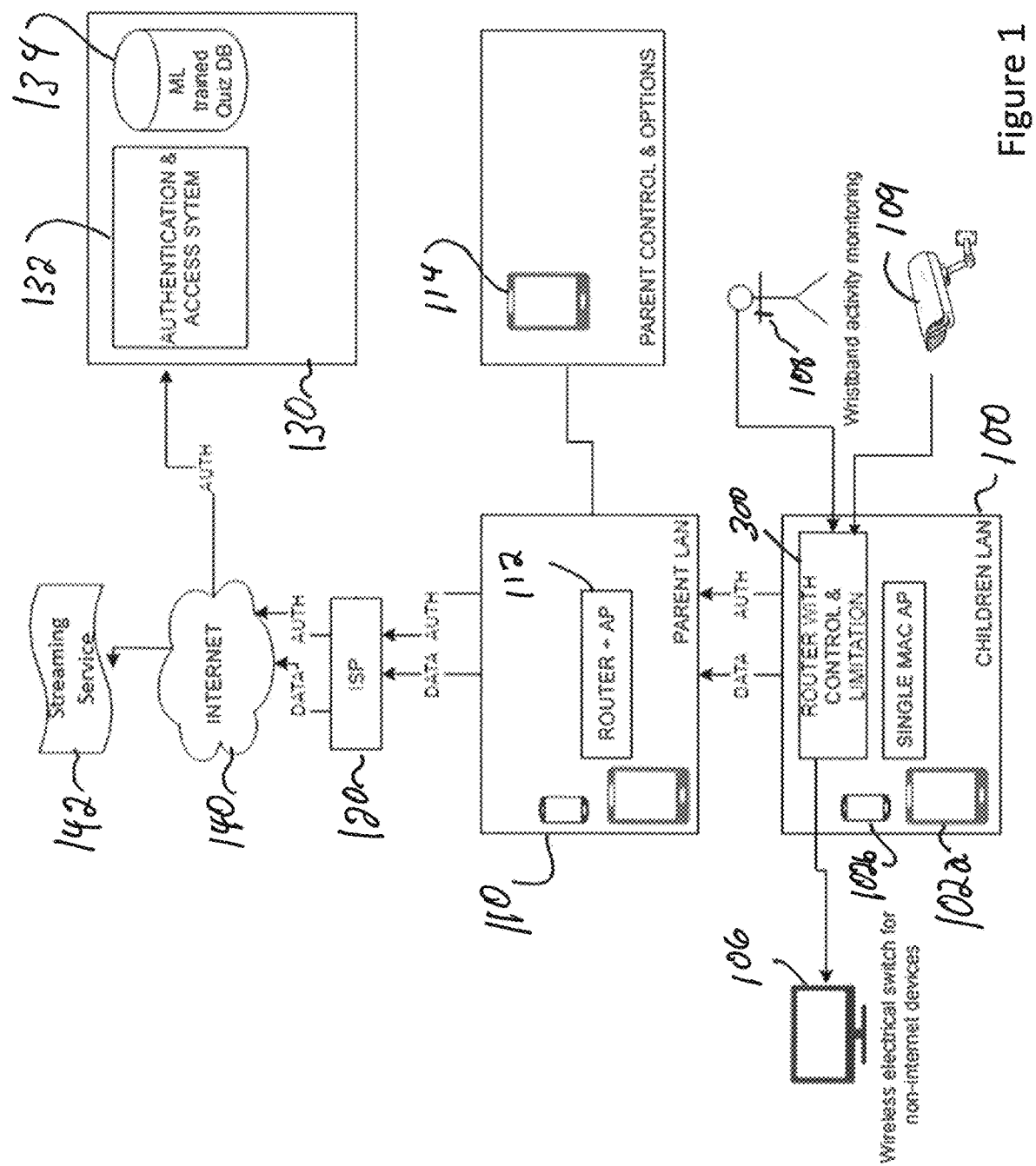
FIG. 1 is a high-level network diagram according to an embodiment of the present technology.

Various aspects of the present disclosure generally address one or more of the problems of controlling access time of users on the Internet and on television.

The present technology is generally intended for controlling access time of users, for example children, to media such as the Internet, television, and the like. Without limiting the generality of the present disclosure, the technology may appear to the user, such as a child, an educational entertainment (edutainment) platform in which the child is invited to respond to a challenge, comprising for example one or more quiz questions, in order to obtain a credit that can be exchanged for some access time to a medium. Access of a client device used by the child, for example a tablet or a computer, is disconnected by a parent of the child from an Internet access, such as a local area network (LAN) managed by the parent (parent LAN) and available in a household, and reconnected to a specific access node that implements the present technology. The access node implements connectivity functions that are the same or equivalent to those provided by a generic router and additionally implements specific functions for support of the present technology. The client device used by the child is not modified in any way, other than being connected to the present access node.

Although the above introduction relates to the need to control and limit access time of children to the Internet and to television, the present technology may be used to control and limit access time of any user to various types of media. The present disclosure introduces no fundamental limitation preventing using the disclosed access node, system, server and method for controlling access of other people to various media.

When the present access node receives an access from a client device of the child, it causes the client device to present a challenge to the child, for example one or more quiz questions. Upon receiving a correct challenge response, a credit is granted in a client account for the child. The child may then exchange the credit for access time to a medium, for example access to an Internet resource or to a television program. In the context of the present disclosure, access may be given to the entire Internet or to Internet resource that are not blocked by the parent LAN. In a variant, access may only be granted to specifically allowed Internet sites.

In line with the edutainment aspect of the present technology, the child may be invited to select an avatar, for example one of a group of cartoon-like cats. The client account for the child is dedicated to the selected avatar so that two or more children may each select a distinct avatar and have their respective client accounts. Each credit may be presented to the child in the client device in the form of a cookie and the child may feed the selected avatar (cat) with a cookie from the client account to request access to the medium. This method of acquiring and exchanging credits is intended to be easy to use and amusing for the child. In addition, an important educational aspect is provided in that the child is required to exert a moderate level of intellectual effort for being granted access to the medium.

In one aspect, the present technology provides an access node, a system and a method that may be used to limit a time of access of children on media such as the Internet or television.

In another aspect, the present technology does not impose the same limits to parents or other family members in a same household.

In another aspect, the present technology induces children to answer educative questions provided automatically on their client devices, without requiring any specific software to be installed on the client device.

In another aspect, the present technology may use machine learning to automatically adjust a level of the challenges to a proper level for the child.

In another aspect, the present technology may track a progress of a child.

In another aspect, the present technology may encourage and track physical activities of a child wearing a motion sensor, for example a wristband In another aspect, the present technology encourages a child to keep his/her room tidy via the use of a camera and machine-learned images of clean and unclean rooms.

In yet another aspect, the present technology may be used to control and limit access to various types of media for users other than children.

Using the present technology, limiting the on-screen time of a child is automated, simple of use, and gradual.

Without limiting the generality of the present disclosure, the present disclosure uses the name SmartCookieWIFI. A SmartCookieWIFI network includes a SmartCookieWIFI server and an access node that blocks Internet with educative questions intended for children. The access node may be installed in three (3) simple steps, including 1) Taking the access node out of the box, 2) Plugging the access node into an existing router, and 3) Connecting a children device, for example a tablet, via WiFi to the SmartCookieWIFI server.

Referring now to the drawings, FIG. 1 is a high-level network diagram according to an embodiment of the present technology. A local area network (LAN) 100 for a child comprises a client device 102 used by the child, for example a tablet 102*a* or an intelligent terminal 102*b*, and an access node 300. The client device 102 may access the Internet under some limitations imposed by the access node 300. The client device 102 accesses a parent LAN 110 via a specific router 112 communicatively connected to the Internet 140. Set up of the access node 300 is very simple, involving connecting the access node 300 to an electrical supply and connecting the access node 300 to the router 112 using a cable or a wireless connection, for example a WiFi connection. The client device 102 may also control a television set 106 via a switch (shown in a later Figure) connected to the access node 300. Optionally, a motion sensor, for example a wristband 108, worn by the child, may be used by the access node 300 to monitor a level of physical activity of the child. As another option, a camera 109 may be installed, for example, in the child's bedroom and provide images that the access node 300 may use to evaluate a tidiness of the bedroom. A SmartCookieWIFI server 130 may communicate with the router 112, devices 114 of the parents and with the access node 300 via the Internet. The parents may use their devices 114 to access an authentication and access system 132 of the SmartCookieWIFI server 130 to define parameters for their child, for example selecting a maximum on screen time, selecting a type and difficulty level of the questions posed to the child, and the like. The child LAN 100 accesses the Internet 140 via the parent LAN 110 and further via ordinary means such as an Internet Service Provider (ISP) 120. The child LAN 100 is authenticated on the SmartCookieWIFI server 130 and a machine learning (ML) trained database 134 presents challenges to the child in the form of quiz questions. Access to various services, for example to a streaming service 142 to see a short movie or a television program, will be granted by the SmartCookieWIFI server 130 to the child LAN 100 and the client device 102 if the child correctly responds to the quiz questions.

Without limiting the present disclosure, quiz questions presented to the child may be adapted to become increasingly difficult with time. Questions may involve any field including, without limitation, English, a second language, Mathematics, History, Geography, and the like. Some questions may be selected so that the child will typically need to consult a book to obtain the correct answer.

Tests have shown that children may tend to reduce their overall screen time and elect to pursue activities other than surfing on the Internet or watching television when the present technology is used.

Figure 2:
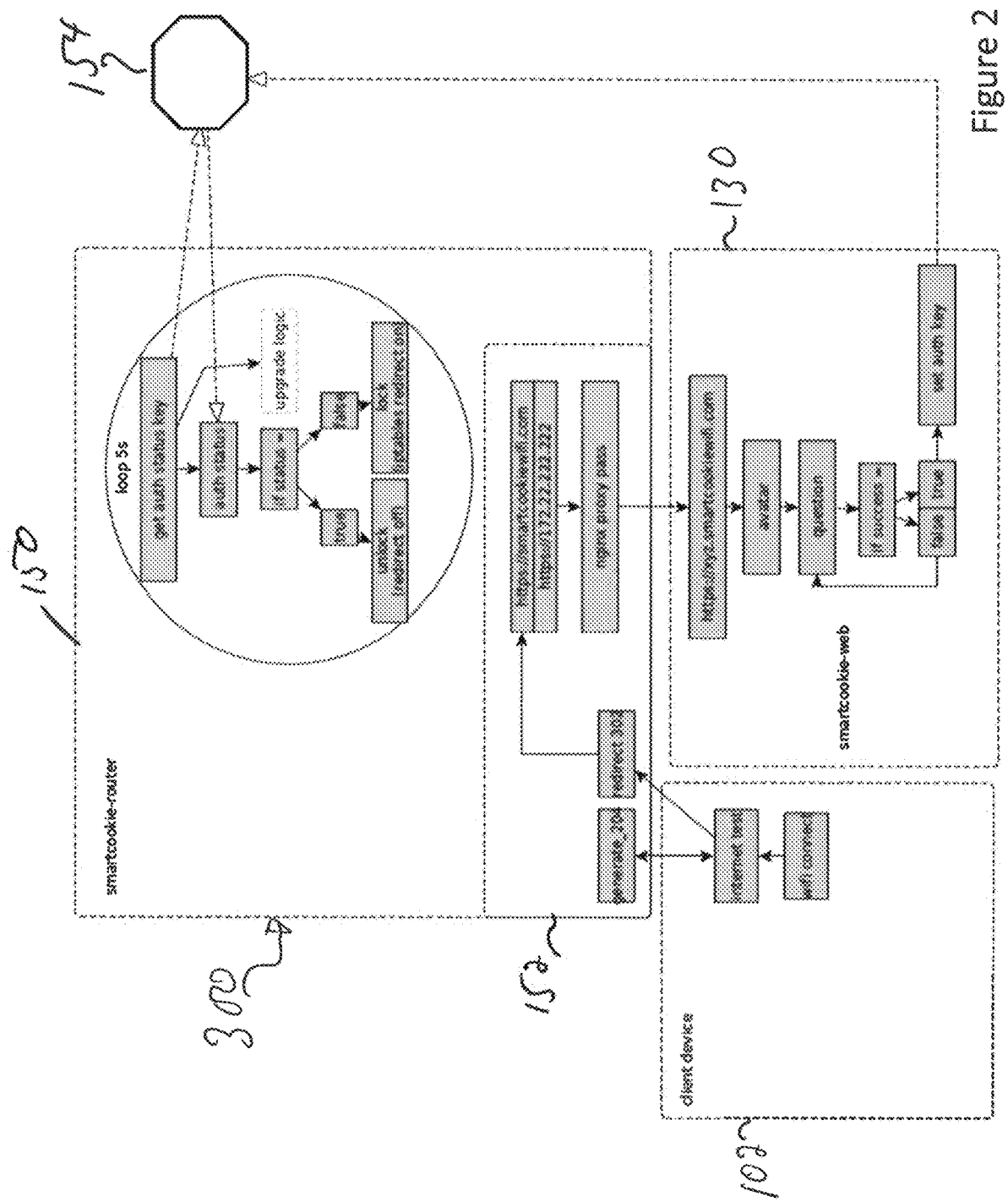
FIG. 2 is a functional schematic diagram according to an embodiment of the present technology.

FIG. 2 is a functional schematic diagram according to an embodiment of the present technology. The functional diagram shows how the client device 102 (child's device) is redirected by the access device 300 to the SmartCookieWIFI server 130 at an address, "https://smartcookeiwifi.com" in a fictional example, when the client device 102 attempts to connect to the Internet. On the SmartCookieWIFI server 130, the child is presented with a choice of an avatar. Once the child has selected an avatar, a quiz question is presented to the child. If the question is correctly answered, the child is authorized to access the Internet or to watch television for a predetermined period of time. Otherwise, the same or another question is presented to the child. In more details, the access node 300 implements a router function 150 and a server function 152. The server function 152 may use an open-source web proxy software solution to implement a proxy for receiving and redirecting accesses from the client device 102 toward the SmartCookieWIFI server 130. The router function 150 and the SmartCookieWIFI server 130 authenticate the accesses from the client device 102 by reference to a distributed database 154, for example a distributed key value store. The SmartCookieWIFI server 130 may provide a list of avatars and a plurality of challenge series used by the client device 102 to present challenges (i.e. quizzes) to the child using the client device 102. The SmartCookieWIFI server 130 may select one of the challenge series based on configuration parameters received from the devices 114 of the parents and transmit the selected challenge series to the access node 300.

Figure 3:
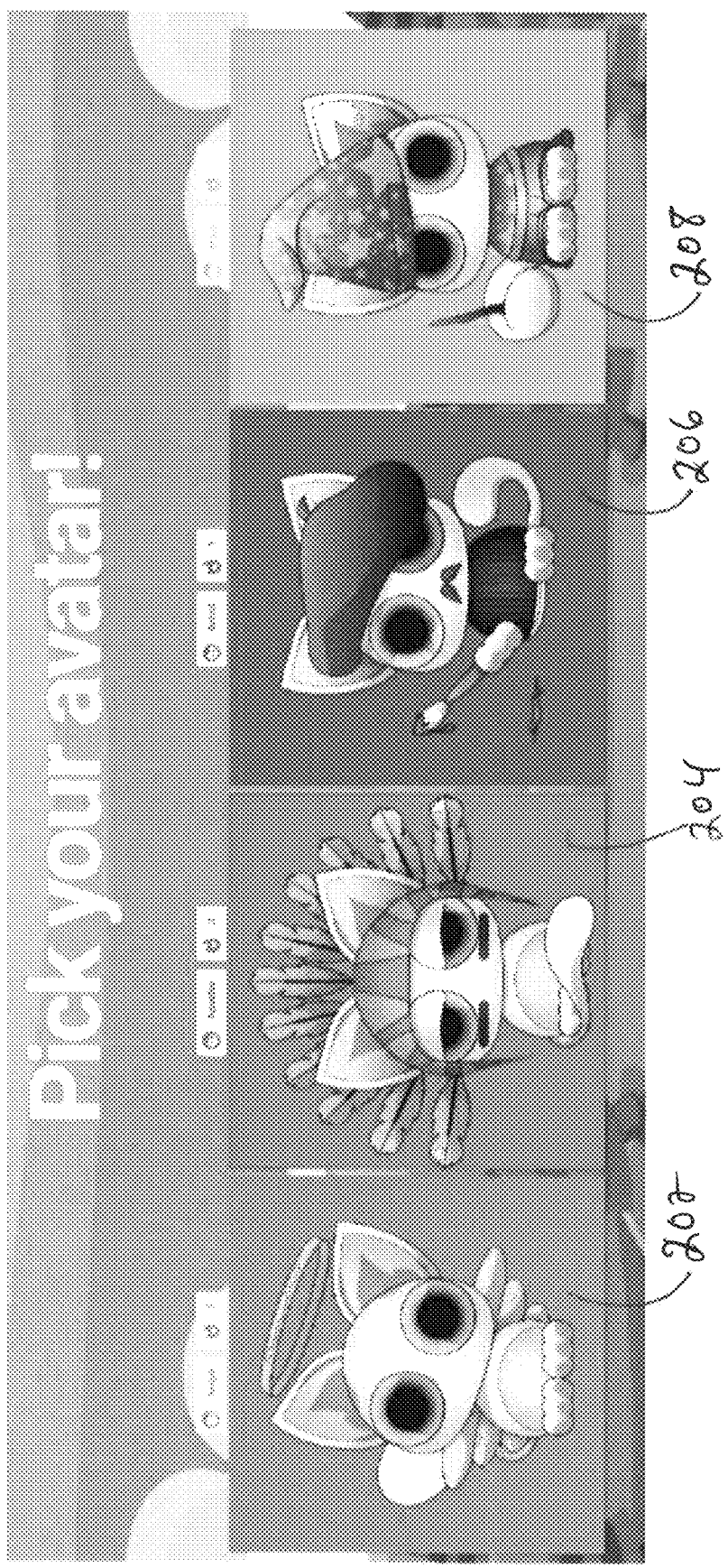
FIG. 3 is an example of a video display inviting a child to select an avatar according to an embodiment of the present technology.
Figure 4:
FIG. 4 is an example of a video display inviting a child to correctly answer a question according to an embodiment of the present technology.

Initially, the access node 300 prevents any access to the Internet from the client device 102. The child is invited to select an avatar among a list of avatars displayed on the client device 102. To this end, the image of FIG. 3 showing avatars 202, 204, 206 and 208 is visible on the client device 102. Once an avatar is selected, a challenge in the form of one or more educative questions is presented on the client device 102, as shown in the example of FIG. 4. The child is granted access to a medium, for example access to an Internet site or another Internet resource, or access to a television program, on the condition that a correct challenge response is selected on the client device 102. Access to the medium may be provided for a limited time period.

In a variant, the visual aspect of the avatar selected by the child may evolve over time based on a story built for the child, the story being related at least in part on the questions correctly answered by the child. Specific details of this story, for example a last place or last character having been met, may be designed to only be known to the child. Knowledge of these details may allow the SmartCookieWIFI server 130 to identify the child without using a username and/or a password. In an aspect, a compelling story may be designed to keep the child interested until a predetermined number of questions, for example 5 questions, have been correctly answered.

Figure 5:
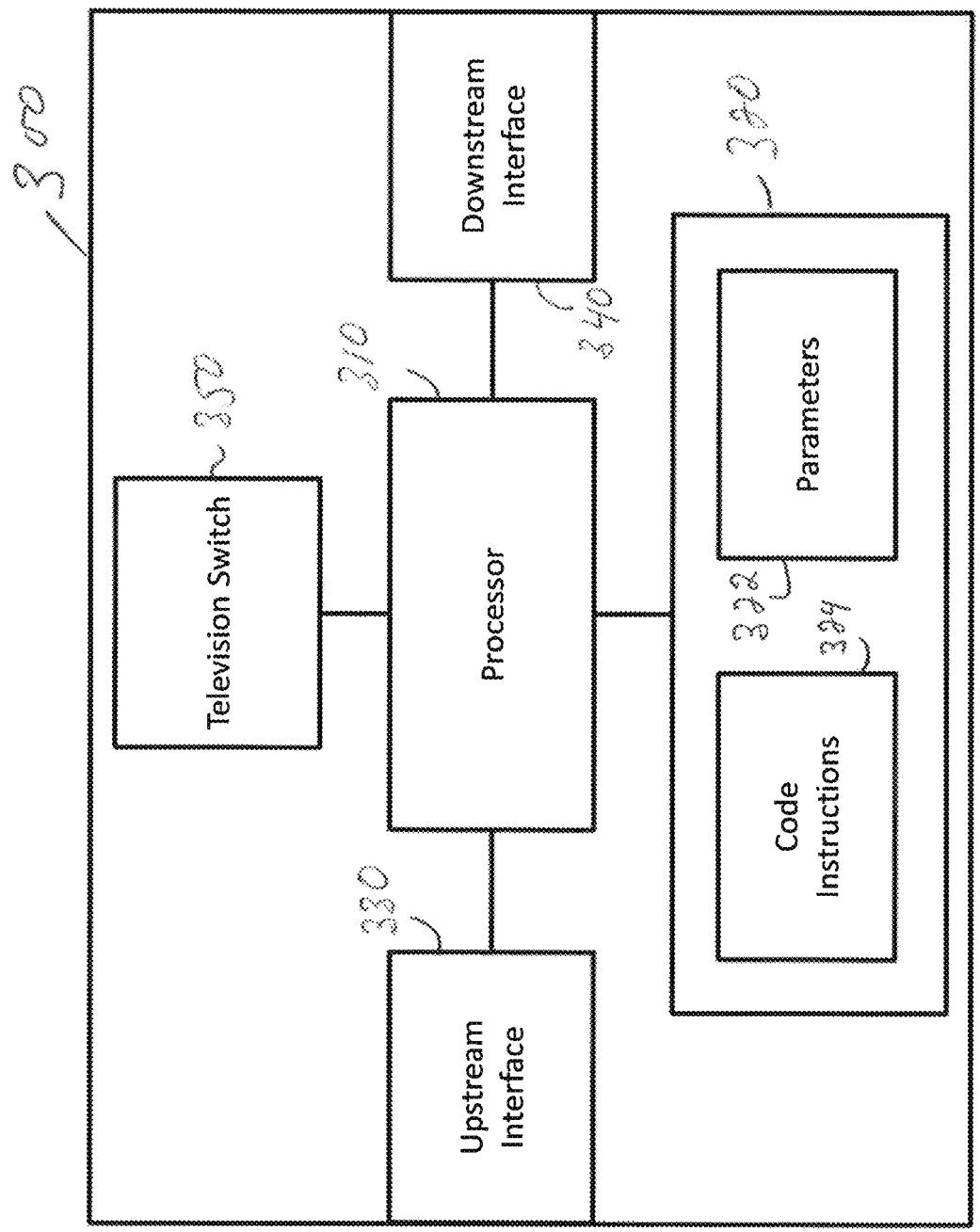
FIG. 5 is a simplified block diagram of an access node according to an embodiment of the present technology.

FIG. 5 is a simplified block diagram of an access node according to an embodiment of the present technology. An access node 300 comprises a processor or a plurality of cooperating processors (represented as a processor 310 for simplicity), a memory device or a plurality of memory devices (represented as a memory device 320 for simplicity), an upstream interface 330 for connecting the access node 300 to the router 112, to the ISP 120, and to the SmartCookieWIFI server 130, as well as a downstream interface 340 for connecting the access node 300 to the client device 102. Either or both of the upstream interface 330 and the downstream interface 340 may be support a wired or a wireless connection, for example using WiFi. In an embodiment, the upstream and downstream interfaces may be implemented as a single unit. The access node 300 may also comprise a television switch 350, which may be a wired or wireless switch, allowing the access node 300 to control turning on and off the television set 106. The processor 310 is operatively connected to the memory device 320, to the upstream interface 330, to the downstream interface 340 and to the television switch 350. In an embodiment, the memory device 320 may include a storage 322 for storing a user account for a user of the client device 102, for storing one or more challenge series obtained from the SmartCookie-WIFI server 130, and for storing parameters, including for example the above-mentioned limited time period of access to the medium granted to the child upon detection of a correct challenge response. In another embodiment, the user account for the user of the client device 102 and the one or more challenge series may reside in the SmartCookieWIFI server 130. The memory device 320 may comprise a non-transitory computer-readable medium 324 for storing instructions that are executable by the processor 310. The access node 300 may support a plurality of users of a same client device 102 and may support a plurality of client devices 102 used by one or more users.

In operation of the access node 300, the processor 310 may detect, via the downstream interface 340, an access from a user of the client device 102. In response to detecting the access, the processor 310 may cause the client device 102 to display a challenge. Alternatively, the processor 310 may cause the upstream interface 330 and the downstream interface 340 to establish a connection between the client device 102 so that the SmartCookieWIFI server 130 may cause the client device 102 to display the challenge. When a challenge response is received from the client device 102, via the downstream interface 340, the processor 310 or the SmartCookieWIFI server 130 verifies the challenge response. If the challenge response is a correct response, the processor 310 or the SmartCookieWIFI server 130 adds a credit for connection of the client device 102 to the medium to the user account. The processor 310 or the SmartCookieWIFI server 130 may cause the client device 102 to display the credit in the form of a cookie.

The processor 310 may receive, from the client device 102, a request to connect to a medium, specifically an Internet resource such as a web site. The processor 310 or the SmartCookieWIFI server 130 verifies the user account in the storage 322. If the user account contains at least one credit, the processor 310 or the SmartCookieWIFI server 130 decrements the user account in the storage 322 by one credit and causes the upstream interface 330 and the downstream interface 340 to establish a connection between the client device 102 and the Internet resource. In an embodiment, the processor 310 may read an allowed time duration for the access to the Internet resource in the storage 322 and initiate a timing function when granting the access. Upon detecting a time expiry for the connection of the client device 102 to the Internet resource, the processor 310 records, in the storage 322, information about the Internet resource, for example the uniform resource locator (URL) of a web page visited by the child using the client device 102, and terminates the connection of the client device 102 to the Internet resource. The processor 310 may then receive, from the client device 102, a request to reconnect to the Internet resource. Upon receiving this request, the processor 310 verifies the user account stored in the storage 322. If there is a remaining credit in the user account, the processor 310 decrements the credit in the user account and reconnects the client device 102 using the recorded information about the Internet resource, for example using the stored URL of the web page previously visited by the child using the client device. In an embodiment, if the user account is empty when receiving the request to reconnect, the processor 310 may cause a new challenge to be presented to the child on the client device 102 so that the child may obtain new credits.

The processor 310 may receive, from the client device 102, a request to connect to another medium, specifically the television set 106. The processor 310 verifies the user account in the storage 322. If the user account contains at least one credit, the processor 310 decrements the user account in the storage 322 by one credit and controls a display of a program on the television set 106 by actuating the television switch 350. In an embodiment, the processor 310 may read an allowed time duration for the access to the television program in the storage 322 and initiate a timing function when granting the access. Upon detecting a time expiry for the connection of the client device 102 to the television program, the processor 310 records, in the storage 322, information about the current program, for example an identity of the program and a current time within the program when placing the program on hold, and controls the television switch 350 and the television set 106 to place the program on hold. The processor 310 may then receive, from the client device 102, a request to resume the television program. Upon receiving this request, the processor 310 verifies the user account stored in the storage 322. If there is a remaining credit in the user account, the processor 310 decrements the credit in the user account and causes the television switch 350 and the television set 106 to resume presentation of the program, for example using the identity of the program and the time within the program when placed on hold. In an embodiment, if the user account is empty when receiving the request to reconnect, the processor 310 may cause a new challenge to be presented to the child on the client device 102 so that the child may obtain new credits.

Despite the above description, many functions of the access node 300 and of the processor 310 may be implemented in the SmartCookieWIFI server 130, in which case the access node 300 may operate in a substantially transparent fashion.

A given child may use more than one access device 102, for example a tablet and a computer terminal. Also, the same access device 102 may be used by more than one child. In an embodiment, the processor 310 may read a first challenge in a given challenge series stored in the storage 322 when receiving a first access from a given client device 102, or when receiving a first access from a given user (child) of the client device 102. In this embodiment, the processor may read a second challenge and subsequent challenges of the same challenge series when receiving a second access and subsequent accesses from the same client device 102 or from the same child. Use of challenge series may help in monitoring the progress of the child as he/she provides correct responses to challenges of an increasing difficulty level.

In the same or another embodiment, the processor 310 may identify a child among using a given challenge series. To this end, a next challenge in the given challenge series may be related to a challenge response for a previous challenge in the same challenge series. The processor 310 then identify the child who provides successive correct challenge responses in the given challenge series.

Another manner of identifying a specific child relates to the use of avatars. The processor 310 may cause the client device 102 to display a list of avatars, for example the avatars 202, 204, 206 and 208 of FIG. 3. The client device 102 provides the access node 300 with an indication of an avatar selected by the child. The processor 310 stores in the storage 322 an association between the user (the child), the avatar, and the user account. Later, the processor 310 may detect, via the downstream interface 340, a new access from the client device 102. The processor 310 causes the client device 102 to display the list of avatars. The child having selected the same avatar as previously selected, the processor 310 receives a new indication of an avatar selection from the client device 102. The processor 310 may identify the user (child) of the client device 102 by matching the avatar selection with the association stored in the storage 322 between the user (child) the avatar.

In embodiments using avatars, the credits may be illustrated on the client device 102 in the form of cookies and exchange of a credit for access to a medium may be displayed on the client device 102 as feeding the avatar with a cookie.

The child may be granted additional credits (for example cookies) in exchange for other behaviors required by their parents. For example, the downstream interface 340 may receive a signal from a motion sensor, for example the wristband 108 worn by the child. The processor 310 may add to the user account a credit when a predetermined number of signals have been received from the motion sensor. The predetermined number of signals required for obtaining a credit may be stored in the storage 322.

Another manner for a child to obtain additional credits may include tidying of his/her bedroom or tidying of a playroom. The camera 109 is installed in the bedroom, playroom, or any other area that the child is expected to keep in a tidy state. The camera 109 supplies an image of the area to the downstream interface 340. The processor 310, alone or with the help of the SmartCookieWIFI server 130, may use a machine learning (ML) analysis of the image to determine a level of clutter in the image. The processor may add to the user account a credit when the level of clutter is less than a predetermined threshold. The predetermined threshold required for obtaining a credit may be stored in the storage 322.

The access node may receive a number of control parameters from the upstream interface 330. The processor 310 may store these control parameters in the storage 322 and use them for controlling access of the child to the media. Many of these control parameters are provided by the parents, using their devices 114. Example of control parameters that may be provided by the parents include one or more of a language applicable to the challenge and to the challenge response, a difficulty level of the challenge, a duration for the connection of the user of the client device to the medium per credit in the user account, a maximum daily duration for access of the user of the client device to the medium, a topic of the challenge, a list of authorized Internet sites, a list of unauthorized Internet sites, a list of authorized television programs, a list of unauthorized television programs, a time of day when access can be allowed to the user of the client device, a day of the week when access can be allowed to the user of the client device, and a scholarly level of the user of the client device. Hence, in addition to the above-described techniques for granting access of a child to a media, the processor 310 may enforce other restrictions regarding visited Internet sites, available television programs, strict restrictions to access at certain times, and the like.

Figure 6:
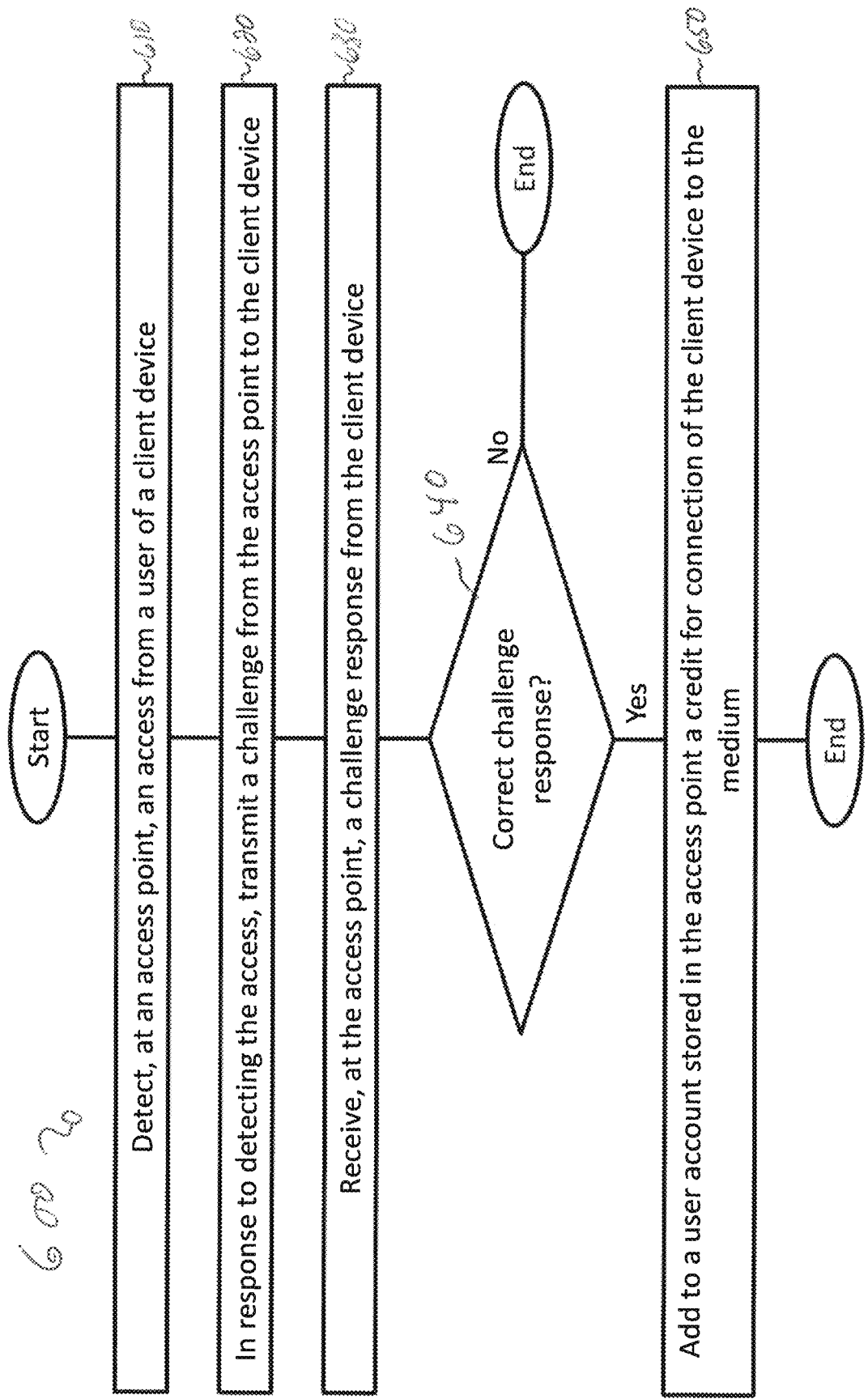
FIG. 6 is a sequence diagram showing operations of a method for updating a user account according to an embodiment of the present technology.

The present disclosure also introduces a method for controlling access of a child to a medium. In an embodiment, this method is implemented in two distinct phases, including a method for updating a user account for the child and a method for granting access to the medium for the child. FIG. 6 is a sequence diagram showing operations of a method for updating a user account according to an embodiment of the present technology. On FIG. 6, a sequence 600 comprises a plurality of operations, some of which may be executed in variable order, some of the operations possibly being executed concurrently, some of the operations being optional. At operation 610, the access node 300 detects an access from a child using the client device 102. In response to detecting the access, the access node 300 transmits a challenge to the client device 102 at operation 620. In an embodiment, the presentation of the challenge to the client device 102 may use operating principles similar to those of captive portals. The challenge may for example comprise one or more quiz questions selected according to an expected educational level of the child. A challenge response, an answer to each of the one or more quiz questions, is received at the access node 300, from the client device 102, at operation 630. The access node 300 or SmartCookieWIFI server 130 verifies whether the challenge response is correct at operation 640. If the response is incorrect, the sequence 600 may end, optionally after sending by the access node 300 of a signal causing the client device 102 to display a message inviting the child make another connection attempt. If the challenge response is correct, the sequence continues at operation 650. In an embodiment where a challenge comprises more than one quiz question, operations 620, 630 and 640 may be repeated for each quiz question and for each corresponding answer until the challenge is completed. At operation 650, the access node 300 or SmartCookieWIFI server 130 adds a credit for connection of the client device to the medium user account. The sequence 600 then ends, optionally after sending by the access node 300 of a signal causing the client device 102 to display a congratulation message.

Figure 7:
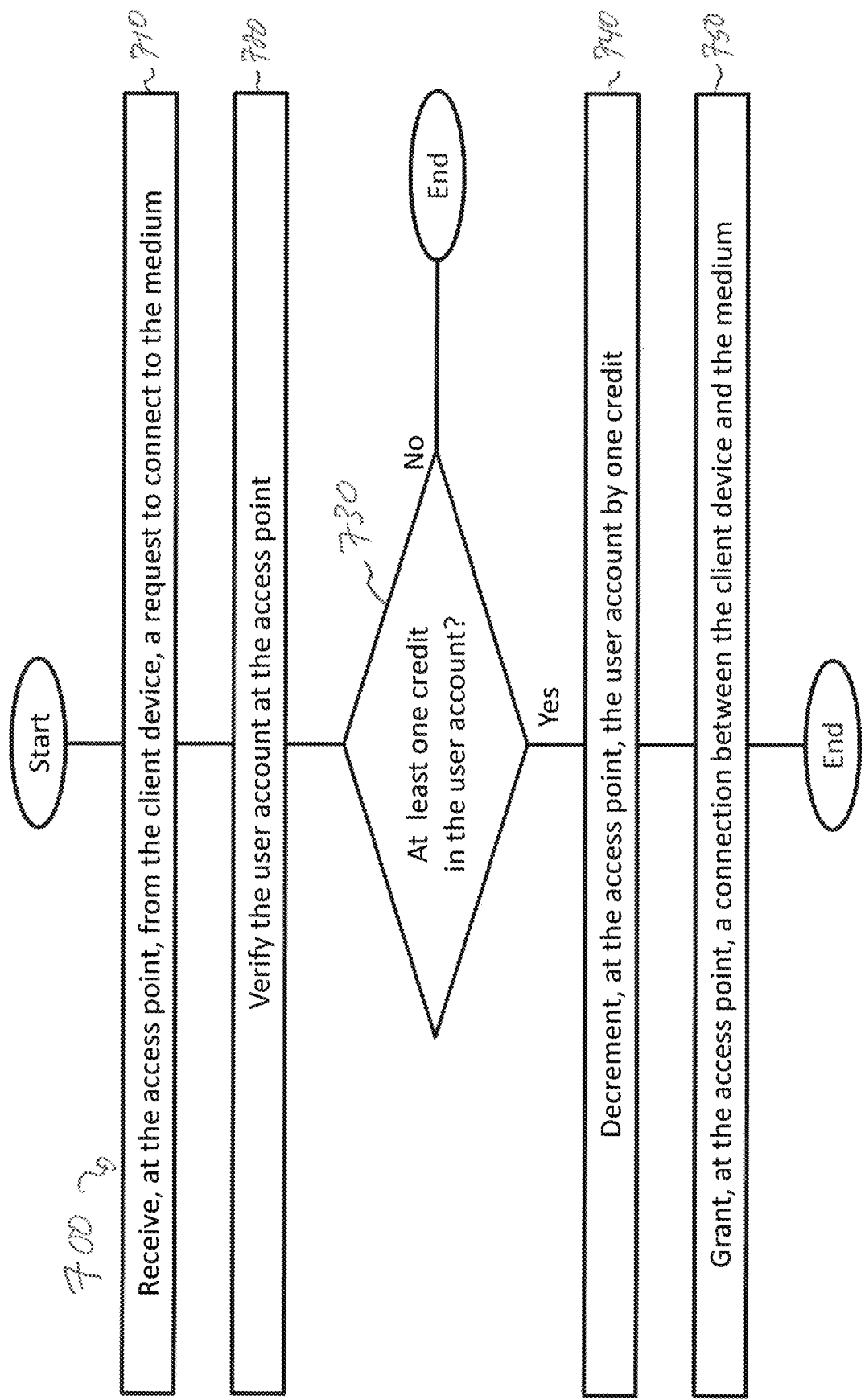
FIG. 7 is a sequence diagram showing operations of a method for granting access to a medium for a user according to an embodiment of the present technology.

FIG. 7 is a sequence diagram showing operations of a method for granting access to a medium for a user according to an embodiment of the present technology. On FIG. 7, a sequence 700 comprises a plurality of operations, some of which may be executed in variable order, some of the operations possibly being executed concurrently, some of the operations being optional. At operation 710, the access node 300 receives, from the client device 102, a request to connect to the medium, the medium being for example an Internet resource or a television program. The access node 300 or SmartCookieWIFI server 130 verifies the user account at operation 720. If operation 730 indicates that the user account does not include at least one credit, the sequence 700 ends, optionally after sending by the access node 300 of a signal causing the client device 102 to display a message inviting the child try a new challenge for increasing his/her credit. If operation 730 indicates that the user account contains at least one credit, the access node 300 or SmartCookieWIFI server 130 decrements the user account by one credit at operation 740 and grants a connection between the client device 102 and the medium at operation 750. The sequence 700 ends after operation 750, the child now having access to the requested Internet resource or to the television program.

Each of the operations of the sequences 600 and 700 may be configured to be processed by one or more processors, the one or more processors being coupled to one or more memory devices, for example the processor 310 and the memory device 320 of FIG. 5.

Those of ordinary skill in the art will realize that the description of the access node, system and method for controlling children access to the Internet and to television are illustrative only and are not intended to be in any way limiting. Other embodiments will readily suggest themselves to such persons with ordinary skill in the art having the benefit of the present disclosure. Furthermore, the disclosed access node, system and method may be customized to offer valuable solutions to existing needs and problems related to controlling access time of children on the Internet and on television. In the interest of clarity, not all of the routine features of the implementations of the system and method are shown and described. In particular, combinations of features are not limited to those presented in the foregoing description as combinations of elements listed in the appended claims form an integral part of the present disclosure. It will, of course, be appreciated that in the development of any such actual implementation of the system and method, numerous implementation-specific decisions may need to be made in order to achieve the developer's specific goals, such as compliance with application-related, system-related, network-related, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of Internet devices having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory device, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via a local memory device, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. An access node for controlling access of a user to a medium, comprising:
   an upstream interface adapted for being connected to a server;
   a downstream interface adapted for being connected to a client device;
   a memory adapted to store a user account for a user of the client device; and a processor operatively connected to the upstream interface, to the downstream interface, and to the memory, the processor being configured to:
  detect, via the downstream interface, an access from the user of the client device,
  in response to detecting the access, cause the client device to display a challenge,
  receive, via the downstream interface, a challenge response from the client device, and
  if the challenge response is a correct response, add to the user account, a credit for connection of the client device to the medium;
wherein the downstream interface is further adapted to receive an image from a camera; and
wherein the processor is further configured to:
  analyze the image to determine a level of clutter in the image, and
  add to the user account a credit in response to the level of clutter being less than a predetermined threshold.

2. The access node of claim 1, wherein:
the medium is an Internet resource; and
the processor is further configured to:
  receive, from the client device, a request to connect to the Internet resource;
  verify the user account; and
  if the user account contains at least one credit, decrement the user account by one credit and establish a connection between the client device and the Internet resource via the downstream and upstream interfaces.

3. The access node of claim 2, wherein the processor is further configured to:
  detect a time expiry related to a time of the connection of the client device to the Internet resource;
  record, in the memory, information about the Internet resource;
  terminate the connection of the client device to the Internet resource;
  receive, from the client device, a request to reconnect to the Internet resource;
  verify the user account; and
  if there is a remaining credit in the user account, decrement the credit in the user account and reconnect the client device using the recorded information about the Internet resource.

4. The access node of claim 1, wherein:
the medium is a television set operatively connected to the access node; and
the processor is further configured to:
  receive, from the client device, a request use the television set;
  verify the user account; and
  if the user account contains at least one credit, decrement the user account by one credit and control a display of a program on the television set.

5. The access node of claim 4, wherein the processor is further configured to:
  detect a time expiry related to a start time of the display of the program on the television set;
  record, in the memory, information about the program on the television set;
  cause the television set to place the program on hold;
  receive, from the client device, a request to reconnect to the Internet resource;
  verify the user account; and
  if there is a remaining credit in the user account, decrement the credit in the user account and cause the television set to resume the program.

6. The access node of claim 1, wherein the processor is further configured to:
  record, in the memory, one or more challenge series;
  select a given challenge series among the one or more challenge series, wherein the challenge is a first challenge in the given challenge series;
  detect, via the downstream interface, a subsequent access request from the client device; and
  cause the client device to display a second challenge in the given challenge series.

7. The access node of claim 6, wherein:
a next challenge in the given challenge series is related to a challenge response for a previous challenge in the given challenge series; and
the processor is further configured to identify the user of the client device based on successive correct challenge responses in the given challenge series.

8. The access node of claim 1, wherein the processor is further configured to add a plurality of credits to the user account in response to receiving a plurality of correct challenge responses.

9. The access node of claim 1, wherein the downstream interface is a wireless interface.

10. The access node of claim 1, wherein the processor is further configured to:
  cause the client device to display a list of avatars;
  receive an indication of a selected avatar from the client device; and
  store in the memory an association between the user of the client device and the avatar.

11. The access node of claim 10, wherein the processor is further configured to:
  detect, via the downstream interface, a new access from the client device;
  cause the client device to display the list of avatars;
  receive a new indication of an avatar selection from the client device; and
  identify the user of the client device by matching the avatar selection with the association between the user of the client device and the avatar stored in the memory.

12. The access node of claim 1, wherein the processor is further configured to receive, via the upstream interface, one or more control parameters for the user of the client device, the one or more control parameter being selected from a language applicable to the challenge and to the challenge response, a difficulty level of the challenge, a duration for the connection of the user of the client device to the medium per credit in the user account, a maximum daily duration for access of the user of the client device to the medium, a topic of the challenge, a list of authorized Internet sites, a list of unauthorized Internet sites, a list of authorized television programs, a list of unauthorized television programs, a time of day when access can be allowed to the user of the client device, a day of the week when access can be allowed to the user of the client device, and a scholarly level of the user of the client device.

13. The access node of claim 1, wherein:
the downstream interface is further adapted to receive a signal from a motion sensor; and
the processor is further configured to add to the user account a credit for a predetermined number of signals received from the motion sensor.

14. A method for controlling access of a user to a medium, comprising:

detecting, at an access node, an access from a user of a client device;

in response to detecting the access, transmitting a challenge from the access node to the client device;

receiving, at the access node, a challenge response from the client device;

if the challenge response is a correct response, add to a user account stored in the access node a credit for connection of the client device to the medium;

receiving an image from a camera;

analyzing the image to determine a level of clutter in the image;

adding to the user account a credit in response to the level of clutter being less than a predetermined threshold;

receiving, at the access node, from the client device, a request to connect to the medium;

verifying the user account at the access node; and if the user account contains at least one credit:
- decrementing, at the access node, the user account by one credit, and
- granting, at the access node, a connection between the client device and the medium.

15. The method of claim 14, wherein the challenge comprises one or more quiz questions and the challenge response comprises an answer to each of the one or more quiz questions.

16. The method of claim 14, wherein the connection of the client device to the medium is limited to a predetermined time duration for each credit in the user account.

17. A system for controlling access of a user to a medium, comprising:
- the access node of claim 1; and
- the server of claim 1, wherein the server is configured to:
  - store one or more challenge series,
  - receive configuration parameters from a device of a parent user,
  - select at least one challenge series based on the configuration parameters, and
  - transmit the selected at least one challenge series to the access node.

18. The system of claim 17, wherein the server is configured to communicate with the device of the parent user and with the access node via Internet.

19. The system of claim 18, further comprising a router communicatively connected to the Internet and to the upstream interface of the access node.

* * * * *